United States Patent [19]
Jankowski

[11] Patent Number: 5,203,581
[45] Date of Patent: Apr. 20, 1993

[54] BABY WALKER

[75] Inventor: Mark D. Jankowski, Cleveland, Ohio

[73] Assignee: Fisher-Price, Inc., East Aurora, N.Y.

[21] Appl. No.: 741,111

[22] Filed: Aug. 6, 1991

[51] Int. Cl.⁵ ................................................ F62B 7/00
[52] U.S. Cl. .............................. 280/87.051; 280/43.22; 16/44
[58] Field of Search ............ 280/87.051, 87.05, 43.24, 280/43.22, 43.18; 16/44, 33, 32, 34, 19; 272/70.3

[56] References Cited

U.S. PATENT DOCUMENTS

| | | | |
|---|---|---|---|
| 1,482,953 | 2/1924 | Tideman | 280/43.22 |
| 4,579,359 | 4/1986 | Schwartz | 280/87.05 |
| 4,699,392 | 10/1987 | Ku | 280/87.051 |
| 4,822,030 | 4/1989 | Cone | 280/87.051 |
| 4,844,209 | 7/1989 | Sedlack | 280/87.051 |
| 5,001,808 | 3/1991 | Chung | 16/44 |

Primary Examiner—David M. Mitchell
Attorney, Agent, or Firm—Cumpston & Shaw

[57] ABSTRACT

A baby walker includes a seat supported by a tray for surrounding a child in a standing position, and permitting the walker to move with the child as he walks, and for supporting a child in a seated position, a friction pad on the walker for selectively engaging the surface upon which the walker is supported for selectively inhibiting movement of the walker, a plurality of supporting wheels on the walker for supporting the walker for rolling translation on the supporting surface, and an adjustable suspension coupled between the walker and one or more of the supporting wheels for selectively actuating one of three modes of operation, namely a first mode in which the friction pad engages the surface substantially continuously for inhibiting movement of the walker, a second mode in which the walker is movably supported on the wheels when the child is standing and is supported on the friction pad means for inhibiting translation when the child is seated, and a third mode in which the walker is continuously supported on the wheels for rolling translation over the surface.

6 Claims, 5 Drawing Sheets

BABY WALKER

This invention relates generally to an infant's walker, and more particularly to a walker having a selectively controllable suspension for allowing in the alternative, free movement, movement while standing, and no movement of the walker.

Baby walkers provide a convenient means for an infant to make the transition from crawling to walking. Walkers provide support for a child in a seated position, but are readily movable by the child in a standing position. Generally, baby walkers include a tray portion having a central opening surrounding the child as the child stands in the walker, and a seat suspended from the central opening. The child can either stand within the central opening with his feet on a supporting surface, or sit with substantially all his weight supported by the seat.

Wheels are commonly provided on baby walkers, so that the child can, while standing within the opening, easily move the walker with him as he begins to walk, and sit at will when tired or when he has reached his destination.

Baby walkers incorporating the above are known. In addition, Ku Patent No. 4,699,392 describes a baby walker having three sets of supporting wheels mounted on the ends of pivotable arms surrounded by a supporting skirt, so that if one wheel drops off the edge of a stair step or the like, the walker will drop down to a position supported by the skirt to prevent the walker from rolling over the edge and down the steps.

It is an object of this invention to provide an improved baby walker having a selectable suspension that acts in combination with a braking surface to provide selectively actuable modes of operation for free wheeling, static placement, and weight sensitive free wheeling/static placement.

Briefly stated, and in accordance with the presently preferred aspect of this invention, a baby walker includes a seat supported by a tray for surrounding a child in a standing position, and permitting the walker to move with the child as he walks, and for supporting a child in a seated position, a friction pad on the walker for selectively engaging the surface upon which the walker is supported for selectively inhibiting movement of the walker, a plurality of supporting wheels on the walker for supporting the walker for rolling translation on the supporting surface, and an adjustable suspension coupled between the walker and one or more of the supporting wheels for selectively actuating one of three modes of operation, namely a first mode in which the friction pad engages the surface substantially continuously for inhibiting movement of the walker, a second mode in which the walker is movably supported on the wheels when the child is standing and is supported on the friction pad means for inhibiting translation when the child is seated, and a third mode in which the walker is continuously supported on the wheels for rolling translation over the surface.

The novel aspects of the invention are set forth with particularity in the appended claims. The invention itself, together with further objects and advantages thereof may be more fully comprehended by reference to the following detailed description of a presently preferred embodiment thereof, taken in conjunction with the accompanying drawings in which:

Figure 1:
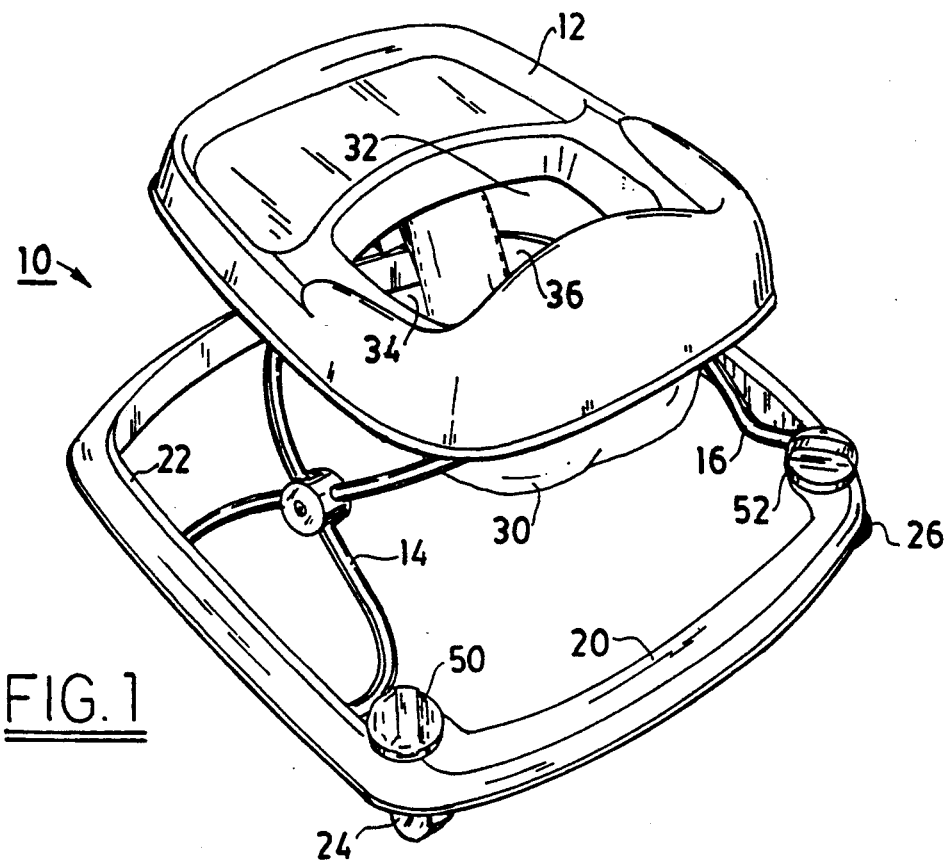
FIG. 1 is a perspective view of a baby walker in accordance with this invention.

Referring now to FIG. 1, a baby walker 10 is illustrated that includes an upper tray 12 supported by resilient X-shaped support members 14, 16 on a generally rectangular base 20. In order to make the baby walker as stable as possible, the base 20 is preferably slightly larger than the tray 10, and is supported by wheels 22, 24, 26, one at each corner of the base. A preferably compliant seat 30, such as a fabric seat, is suspended from the tray 12 beneath a central opening 32. Leg apertures 34, 36 are formed in the seat 30 for allowing a child to either sit comfortably with his legs hanging and his weight supported by the seat 30, or to stand within the opening 32 in the tray portion of the walker with his feet extending through a central opening in the base and through the leg aperture, for walking upon a supporting surface 38. A generally wedge shaped braking pedestal 40 extends downwardly from the base 20, between the front wheels 22 and the rear wheels 24 of the walker 10. The pedestal 40 has an at least substantially flat portion 44 preferably provided with a layer 46 of rubber or another high friction material for engaging the supporting surface 38, to prevent movement of the walker, even when the child is standing therein.

Figure 2:
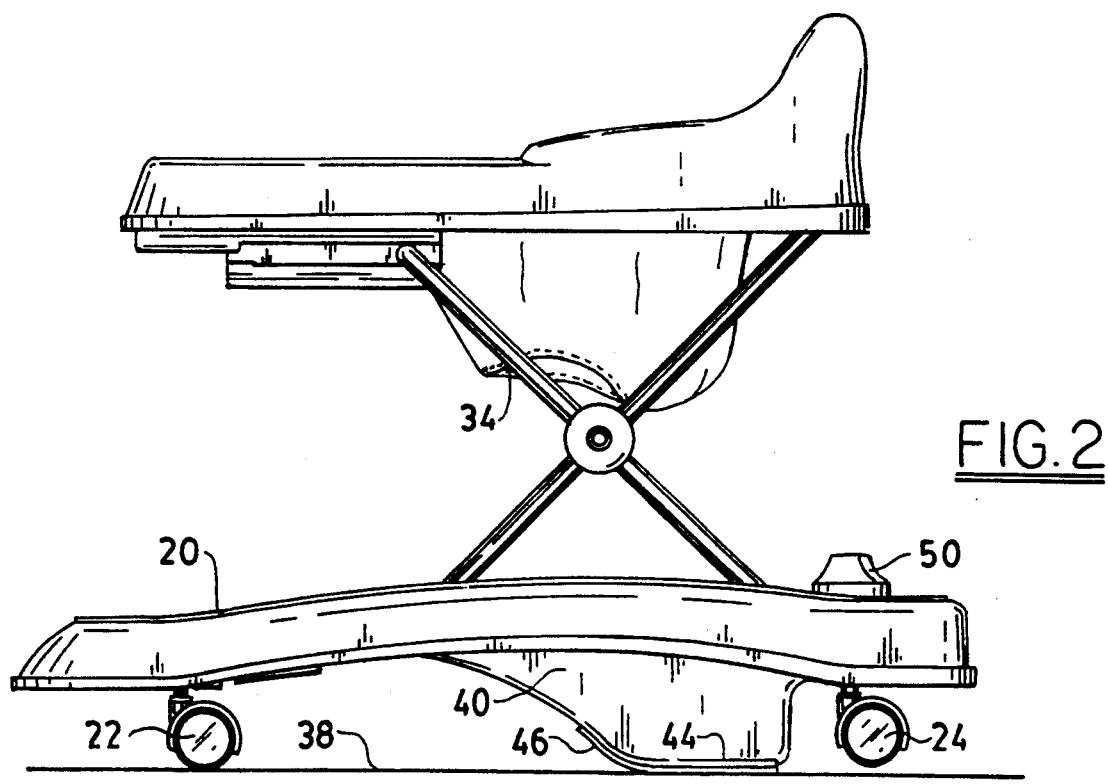
FIG. 2 is a left side elevation of the baby walker of FIG. 1, showing the same in a first mode.
Figure 3:
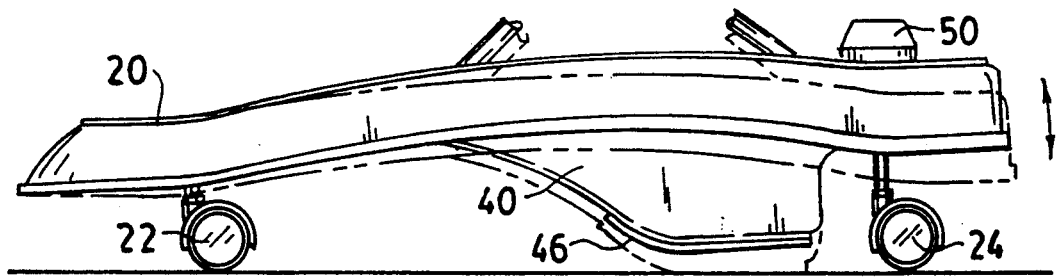
FIG. 3 is a fragmentary left side elevation of the baby walker of FIG. 1, showing the baby walker in a second mode.
Figure 4:
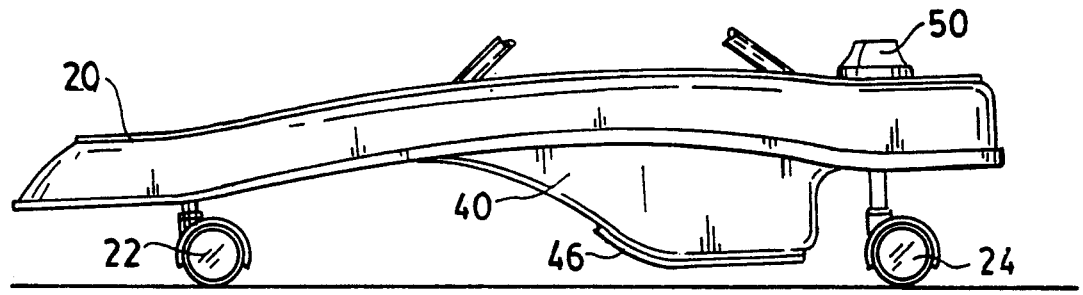
FIG. 4 is a fragmentary left side elevation of the baby walker of FIG. 1, showing the same in a third mode of operation.
Figure 5:
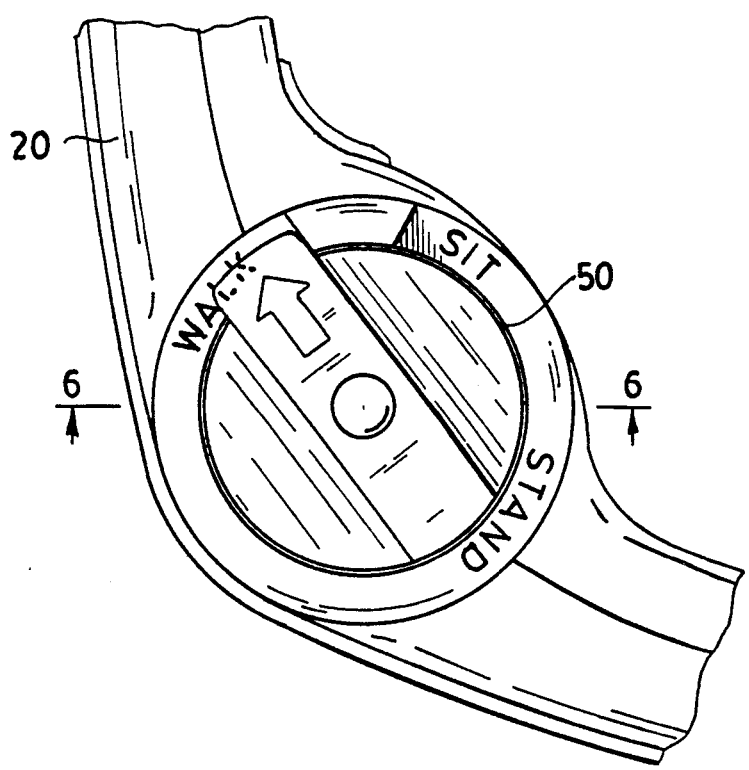
FIG. 5 is an enlarged fragmentary view of a control knob, as shown in FIG. 1.

Control knobs 50, 52 are mounted on the base 20 of the walker 10 generally above each of the two rear wheels 24, 26 for selecting one of three suspension mode settings. In a first mode, as shown in FIG. 2, the wheels are retracted sufficiently so that the walker base 20 rests on the layer of high friction material 46 to inhibit movement of the walker. In a second mode, as shown in FIG. 3, the wheels 24, 26 are resiliently extended, so that the layer of high friction material 46 is lifted above the supporting surface 38 when a child is standing in the walker 10, but engages the supporting surface 36 when the child is sitting in the walker. In this way, when the child stands, the walker is supported on the wheels and easily moves with him, but when he sits, the walker is stably held in position by the friction layer 46. In a third mode, as shown in FIG. 4, the wheels 24, 26 are fixed in an extended position elevating the friction surface 46 above the supporting surface 38, so that the walker 10 can be freely translated whether the child is standing or sitting in it. For convenience, applicant has designated these three modes sit, stand and walk respectively. As shown in FIG. 5, the control knobs 50, 52 are rotatable about a central axis to select one of the three suspension modes.

Figure 7:
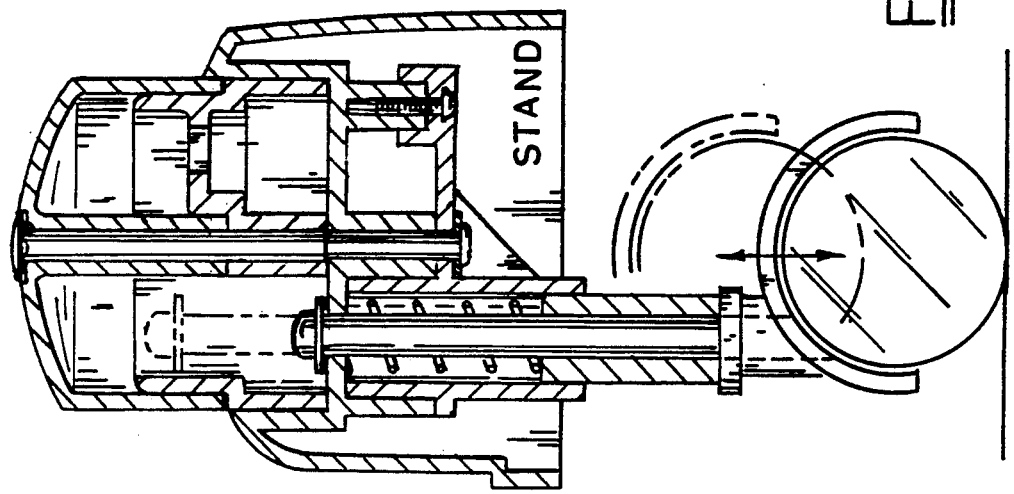
FIG. 7 is a section taken along lines 6—6 of FIG. 5 showing the walker in a second mode.
Figure 6:
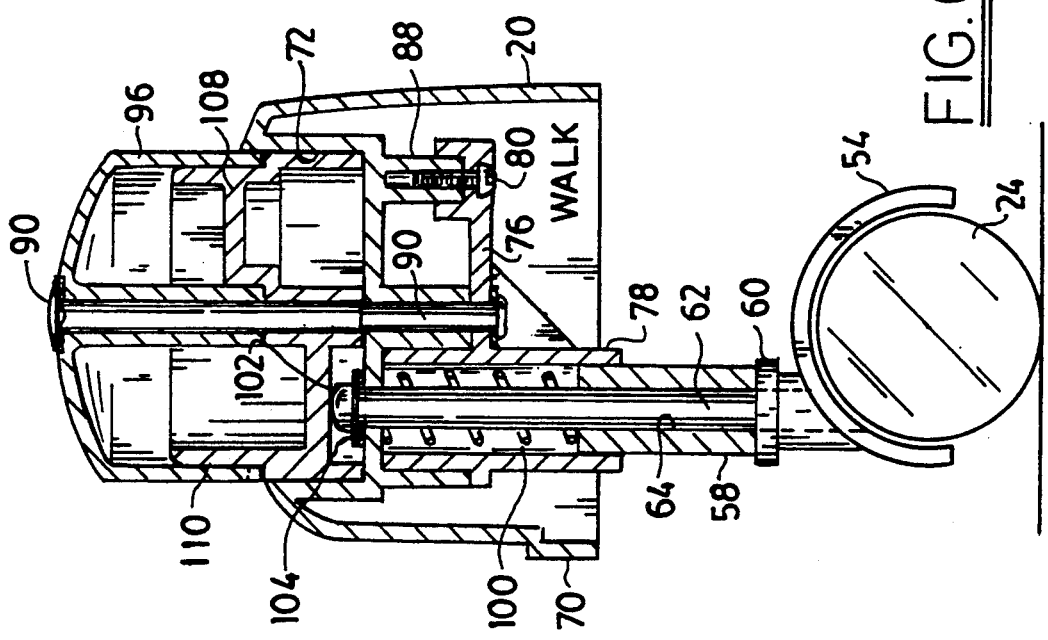
FIG. 6 is a section taken along lines 6—6 of FIG. 5 showing the suspension in the third mode.
Figure 8:
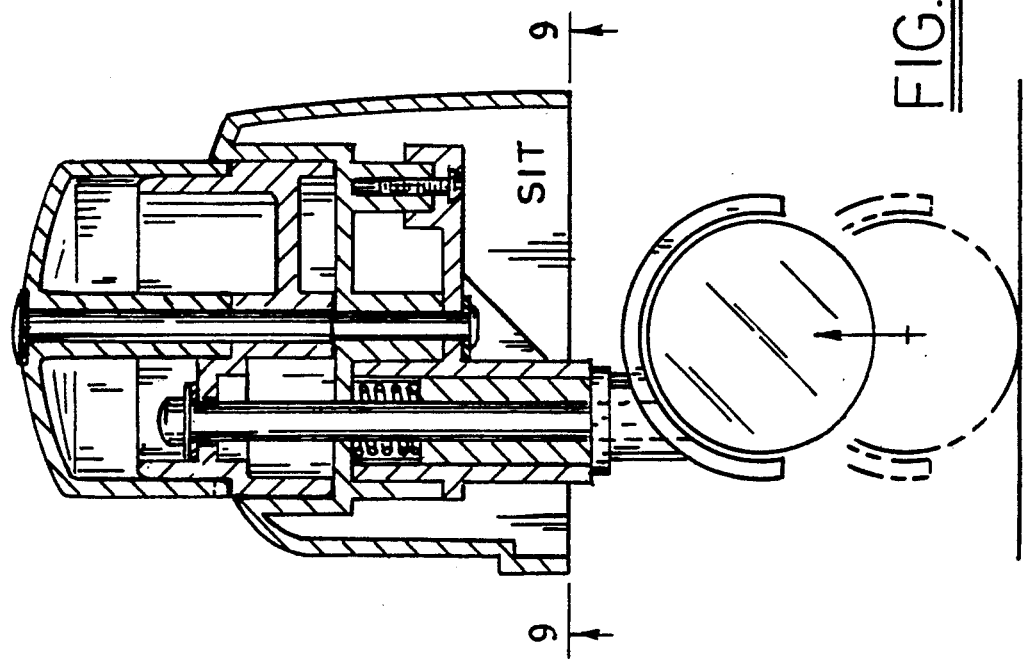
FIG. 8 is a section of the suspension for the baby walker of this invention taken along lines 6—6 of FIG. 5, showing the walker in a first mode.

The construction of the adjustable suspension may be more readily appreciated by referring to FIGS. 6, 7, and 8, in which, as in the remaining figures, like elements are designated by like reference numerals. With reference to the three figures, a conventional wheel 24 is supported on an axle or the like (not shown). The wheel is at least partially covered by a fender 54 that is attached to a generally vertically extending sleeve 58, having a stop collar 60 mounted thereon just above the top of the fender 54. A vertically extending stem 62 is received within an inner bore 64 in the sleeve 58 and extends upwardly beyond the sleeve a substantial distance.

Figure 9:
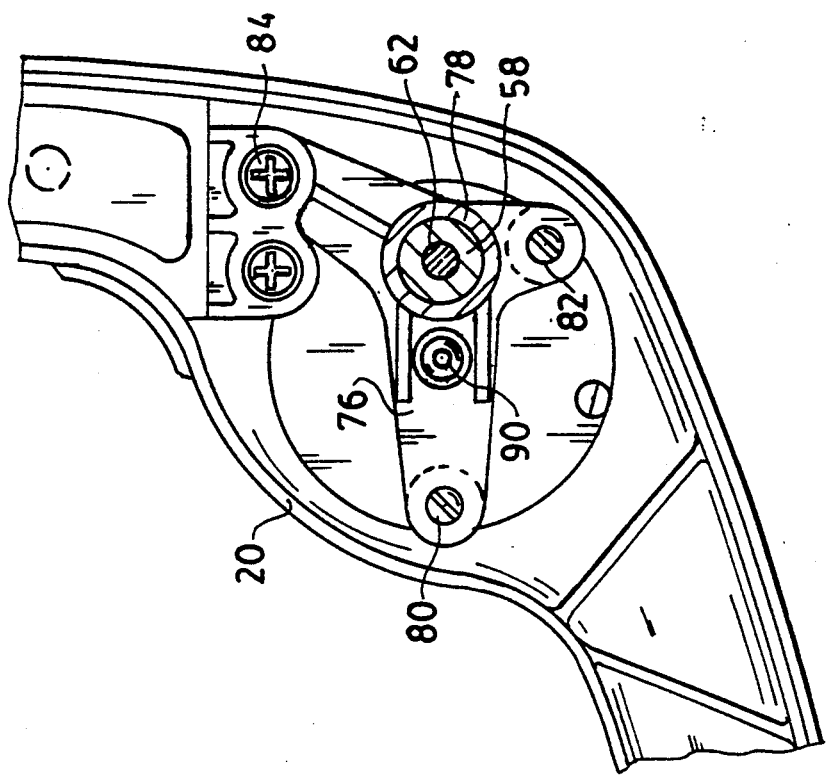
FIG. 9 is a bottom plan view, partly in section, of the wheel suspension of a baby walker in accordance with this invention.
Figure 10:
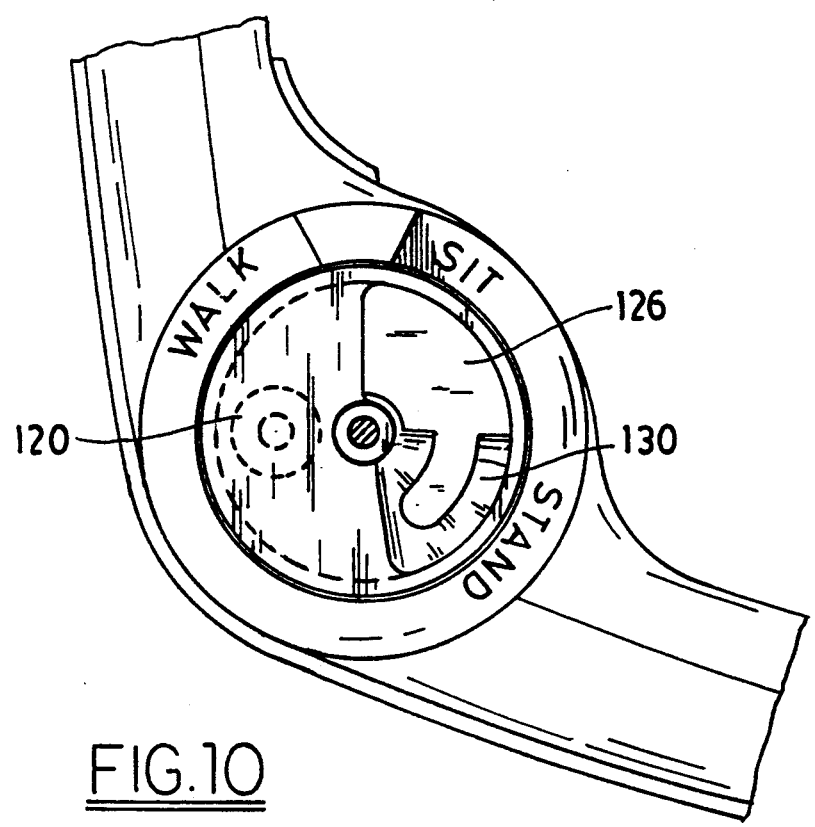
FIG. 10 is a top plan view of the interior mechanism of the suspension controller of the baby walker in accordance with this invention.
Figure 11:
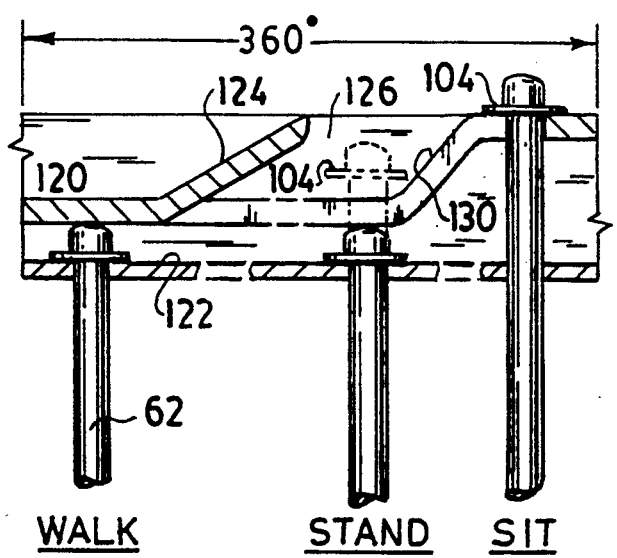
FIG. 11 is an unwound diagrammatic view showing the operation of the suspension controller for the baby walker of this invention.

The walker base 20, as seen in cross-section, includes a skirt 70 having a generally cylindrical well 72 formed in the top surface thereof. A bracket 76 that includes an outer sleeve 78 for receiving the stem 62 and the wheel sleeve 58 is mounted to the base 20 beneath the cylindrical cavity 72. The bracket 76 is generally Y-shaped (See FIG. 9), and is attached by screws 80, 82, 84 to downwardly extending bosses 88, and by a rivet 90 that extends upwardly through the bracket 76, the walker base 20 and a control knob 96 mounted in the cylindrical recess 72. The stem 62 has a spring 100 disposed around the upper portion thereof between the top of the wheel sleeve 58 and the lower surface of the walker base 20. The stem has a slightly enlarged head 102 and a washer 104 disposed around the shaft of the stem 62, just below the head 102. The control knob 96 is rotatably secured within the cylindrical well 72 by the longitudinally extending rivet 90 that extends through the bracket 76, base 20, control cylinder 108, and cap 110. The control cylinder 108 and the cap 110 turn together as a unit, and for convenience will be considered together as constituting the control knob 96. The interaction of the control cylinder 108 with the upper end of the wheel spindle 62 may be most easily appreciated by reference to FIG. 11, which is an unrolled view of the control cylinder 108. The walk, stand, and sit modes are illustrated by showing the top end 102 of the spindle 62 relative to the control surface 120 of the control cylinder 108. In the walk mode, the head 102 of the spindle 62 is captured between the control surface 120 and the bottom surface 122 of the cylindrical cavity 72 that receives the control knob 98. In the stand mode, as also illustrated in FIG. 7, the spindle 62 is free to move up an down, biased to a downwardly extending position by the spring 100, and limited in its upper travel by the interaction of the stop shoulder 60 and the bottom of the outer sleeve 78. In the sit mode, the washer 104 engages the upper control surface 120 to fully retract the wheel 24 to a locked raised position, as shown in FIG. 8. In this position, the spring 100 is substantially compressed, and assists in holding the wheel in place. As can be seen by reference to FIGS. 10 and 11, in moving from the walk mode to the stand mode, the head of the spindle passes under and beyond upwardly inclined projecting surface 124 of the control surface 120, to coincide with an opening 126 in the control surface that permits the spindle 62 to move up and down freely to pass from the stand mode, to the sit mode, the base is depressed slightly by pushing on the control knob 96 to raise the washer 104 to a level where it engages the upper surface of the inclined cam portion 130 of the control surface 120, to allow the spindle to ride upwardly to the position shown at the right in FIG. 11, where it is constrained from further extension.

While the invention has been shown and described in connection with a presently preferred embodiment thereof, those skilled in the art will recognize that certain modifications and changes may be made therein without departing from the true spirit and scope of the invention, which accordingly is intended to be defined solely by the appended claims.

What is claimed is:

1. A baby walker comprising:
    seat means for surrounding a child in a standing position for causing the walker to move with the child, and for supporting the child in a seated position;
    friction pad means on the walker for selectively engaging a surface upon which the walker is supported for inhibiting translation of the walker;
    a plurality of support wheels on the walker for supporting the walker for rolling translation on the supporting surface;
    adjustable suspension means coupled to one or more of the support wheels for selectively actuating one of three modes, the suspension means including a generally vertical stem connected to the wheel for allowing the wheel to move vertically;
    a housing surrounding the stem;
    spring means on the stem for resiliently biasing the stem to an extended position relative to the housing; and
    control means having cooperating surfaces for engaging an end of the stem opposite the wheel for selectively limiting the motion of the stem to actuate one of three modes;
    a first mode in which the friction pad means engage the surface substantially continuously for inhibiting translation of the walker;
    a second mode in which the walker is movably supported on the wheels when the child is in the standing position and is supported on the friction pad means for inhibiting translation when the child is in the seated position; and
    a third mode in which the walker is continuously supported on the wheels for rolling translation over the surface.

2. The baby walker of claim 1 in which the plurality of support wheels comprises first and second support wheels mounted on the walker for continuous rolling support, and third and fourth support wheels mounted on said adjustable suspension means.

3. The baby walker of claim 2 in which the friction pad means is disposed between the first and second wheels, as a first group and the third and fourth wheels as a second group.

4. The baby walker of claim 1 in which the control means comprises a rotatable selection knob disposed generally above the one or more support wheels that are coupled to the adjustable suspension means.

5. The baby walker of claim 4, in which the rotatable selection knob comprises a control knob rotatably mounted on an axis adjacent to but spaced apart from the stem;
    the control knob including a control surface having three regions, a first region for engaging and retaining the stem in a fully retracted position, a second region for permitting the stem to move freely against the bias of the spring means, and a third region for holding the stem in a fully extended position.

6. The baby walker of claim 5, further comprising a washer on the stem for engaging the control surface in said third position.

* * * * *